United States Patent
Hippeläinen et al.

(10) Patent No.: US 7,289,504 B1
(45) Date of Patent: Oct. 30, 2007

(54) METHOD AND APPARATUS FOR GENERATING A CONNECTION IDENTIFICATION

(75) Inventors: Lassi Hippeläinen, Helsinki (FI); Jussi-Pekka Sairanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1072 days.

(21) Appl. No.: 10/296,478

(22) PCT Filed: May 31, 2000

(86) PCT No.: PCT/EP00/05011

§ 371 (c)(1),
(2), (4) Date: May 14, 2003

(87) PCT Pub. No.: WO01/93540

PCT Pub. Date: Dec. 6, 2001

(51) Int. Cl.
*H04L 12/28* (2006.01)

(52) U.S. Cl. ............... 370/392; 370/389; 370/338; 370/349; 370/466

(58) Field of Classification Search ............... None
See application file for complete search history.

(56) References Cited

U.S. PATENT DOCUMENTS

| | | | |
|---|---|---|---|
| 6,683,853 B1 * | 1/2004 | Kannas et al. | 370/237 |
| 6,839,339 B1 * | 1/2005 | Chuah | 370/349 |
| 6,937,566 B1 * | 8/2005 | Forslow | 370/231 |

FOREIGN PATENT DOCUMENTS

WO  9937103  4/1999

OTHER PUBLICATIONS

D.C. Lee, et al.; "The Next Generation of the Internet: Aspects of the Internet Protocol Version 6", vol. 12, No. 1, 1998, pp. 28-33.
C. Perkins, IP Mobility Support, RFC 2002, Oct. 1996, pp. 1-81.
J. Postel, Internet Protocol, Darpa Internet Program Protocol Specification, RFC 791, Sep. 1981, 46 pp. USC/Information Sciences Institute, Marina del Rey, California, 90291, U.S.A.
J. Postel, "Internet Control Message Protocol, Darpa Internet Program Protocol Specification," RFC 792, Sep. 1981, 20 pp., Information Sciences Institute, Marina del Rey, California, 90291, U.S. A.
Y. Rekhter, et al., "Address Allocation for Private Internets," RFC 1597, Mar. 1994, 8 pp., Network Working Group.
M. Leech et al., "SOCKS Protocol Version 5," RFC 1928, Mar. 1996, 9 pp., Network Working Group.

(Continued)

*Primary Examiner*—Duc Ho
(74) *Attorney, Agent, or Firm*—Foley and Lardner LLP

(57) ABSTRACT

The present invention relates to a method and apparatus for generating an identification to be used for a connection in a network. The identification is generated by adding a reuse information (reuse field or bit) to an allocated identifier to thereby increase the time period until the same identification is generated again. The reuse information is updated and used for generating the new identification when the allocated identifier is reallocated to a new connection. Since the time period until the same identification is reused is increased, the risk of misrouting any data packets relating to a destroyed connection can be significantly reduced.

31 Claims, 3 Drawing Sheets

OTHER PUBLICATIONS

C. Perkins, "IP Mobility Support," RFC 2002, Oct. 1996, 71 pp., Network Working Group.

S. Kent et al., "Security Architecture for the Internet Protocol", RFC 2401, Nov. 1998, 59 pp., Network Working Group, Copyright© The Internet Society (1998).

P. Srisuresh et al., "IP Network Address Translator (NAT) Terminology and considerations;" RFC 2663, Aug. 1999, 27 pp., Network Working Group, Copyright© The Internet Society (1999).

G. Tsirtsis, et al., "Network Address Translation—Protocol Translation (NAT-PT)," RFC 2766, Feb. 2000, 19 pp., Network Working Group. Copyright© The Internet Society (2000).

M. Borella, et al., "Realm Specific IP: Framework, draft-ietf-nat-rsip-framework-04.txt," Mar. 2000, 32 pp.

* cited by examiner

IPv6 address

METHOD AND APPARATUS FOR GENERATING A CONNECTION IDENTIFICATION

FIELD OF THE INVENTION

The present invention relates to a method and apparatus for generating an identification to be used for a connection in a network such as a UMTS (Universal Mobile Telecommunications System) or GPRS (General Packet Radio Services) network.

BACKGROUND OF THE INVENTION

Data packet routing to a mobile user is a problem in the UMTS or GPRS network. This is because the mobile users' data network address typically has a static routing mechanism, while the mobile station can roam from one subnetwork to another. One approach for data packet routing in a mobile environment is the concept of mobile IP (Internet Protocol), as described e.g. in "IP Mobility Support" by C. Perkins, RFC 2002, October 1996. Mobile IP enables the routing of IP datagrams to mobile hosts, independent of the subnetwork point of attachment. Another approach is taken in the system for cellular digital packet data (CDPD), where the routing to mobile hosts is handled internally by the network.

With GPRS, the infrastructure consists of support nodes, such as the GPRS gateway support node (GGSN), and the GPRS serving support node (SGSN). These nodes have corresponding functions in the mobile IP concept as the home agent (HA) and the foreign agent (FA). The main functions of GGSN involve interaction with the external data network. The GGSN updates the location directory using routing information supplied by the SGSNs about a mobile station's path, and routes an external data network protocol packet encapsulated over the GPRS backbone to the SGSN currently serving the mobile station. It also decapsulates and forwards external data network packets to the appropriate data network and handles the charging of data traffic.

From the standpoint of the data network, the GPRS network resembles a subnetwork in the data network. For example, in the Internet, the GGSN acts like an IP router behind which the entire GPRS network is hidden. A computer in the Internet network then sees the GPRS network as an IP subnetwork to which messages are sent, as if the GPRS network were a completely standard Internet implementation. The routing mechanism in the data network is exactly the same as with the normal Internet receiver case.

The GPRS network encapsulates all data network protocols into its own encapsulation protocol. This is done to ensure security in the backbone network and to simplify the routing mechanism and the delivery of data over the GPRS network.

In order to access the GPRS services, a mobile station first makes its presence known to the network by performing a GPRS attach. This operation establishes a logical link between the mobile station and the SGSN, and makes the mobile station available for services like SMS (Short Message Service) over GPRS, paging via the SGSN and notification of incoming GPRS data.

In order to send and receive GPRS data, the mobile station activates the packet data address it wants to use. This operation makes the mobile station known in the corresponding GGSN, and interworking with external data networks can commence.

User data is transferred transparently between the mobile station and the external data network with a method known as encapsulation and tunnelling, wherein data packets are equipped with GPRS-specific protocol information and transferred between the mobile station and the GGSN. This transparent transfer method lessens the requirement for the GPRS network to interpret external data protocols, and enables easy introduction of additional interworking protocols in the future. GPRS supports interworking with networks based on the Internet protocol (IP) which is defined in the specification RFC 791.

The GPRS Tunnelling Protocol (GTP) defines the way data packets are passed between various GPRS support nodes (GSNs). When an SGSN and a GGSN establish a communication tunnel for user data packets between each other, they both create a data structure, i.e. a PDP (Packet Data Protocol) context, which contains information about e.g. usage time and user address and the like. The structure is associated to a single communication tunnel with a four-octet identifier. This identifier is then sent to the other GSN at the other end of the tunnel, which will then add that identifier to every data packet related to the tunnel. A Tunnel Endpoint Identifier (TEID) allows for a quick look up of the correct PDP context. Typically, the identifier notifies the position of the PDP context in a preallocated table of PDP context structures.

The PDP context look-up must be very quick. The quickest possible way to associate a structure to a four-octet identifier is to adapt the identifier to the structure's position in a table. In its initialisation phase, the application allocates a PDP context table of maximum number of simultaneous PDP contexts. Then, a so-called "free slot list", i.e. a linked list of free PDP context locations, is provided, which initially contains all slots or PDP context locations in the table. When a tunnel is created, an identifier is popped from the beginning of the list. When a tunnel is destroyed, the associated identifier is pushed to the end of the list. Thus, the free slot list will roll over after some time, such that identifiers associated to an old connection destroyed earlier are allocated to a new connection. This might lead to the problem that some late data packets associated to a destroyed connection are routed to a new completely different connection, because the new tunnel endpoint of the new connection has been given the same identifier as the previous old connection. Thus, data packets may be routed to wrong users.

Furthermore, in case of a connection to an external network, one or more network layer addresses, i.e. PDP addresses, are temporarily and/or permanently allocated to a GPRS subscriber or user. These PDP addresses conform to the standard addressing scheme of the respective network layer service used, e.g. IP version 4 (IPv4), IP version 6 (JPv6) and X.121. The PDP contexts are activated and deactivated through mobility management procedures. When dynamic addressing is used, it is the responsibility of the GGSN to allocate and release the dynamic PDP address.

The need for IPv6 addresses in mobile phones is getting more and more important. IPv6 defines that the nearest router to which a node is connected provides an address to the node. The address has to be globally unique. It is the responsibility of the router to make sure that the address is unique. In particular, the IPv6 address consists of a preconfigured prefix and a suffix that is generated on the fly. The prefix guarantees uniqueness as a subnet. The suffix has to be unique within that subnet.

A unique IPv6 address can be calculated from a globally unique parameter which is associated with the mobile user, e.g. the telephone number, IMSI (International Mobile Subscriber Identity) or the like. However, such schemes reveal the user's identity to the access network, which is in many cases considered to be an attack on privacy. Therefore, non-identifying dynamic addresses are preferred. Since dynamic addresses cannot use a globally unique source, uniqueness must be guaranteed in another way. If a context is activated using the address of a previous context, immediately after it has been deactivated, the new context could receive messages that were intended for the old one, as already described in connection with the GTP protocol. There can be many such messages, e.g. since the corresponding hosts of a previous context may still be sending status requests and keep-alive messages. Then, the recipient would have to pay for receiving these bandwidth wasting datagrams, even though they are unsolicited, which causes problems with fair billing. The problem can be even more severe due to the fire-wall between the users and the Internet. A fire wall with "stateful inspection" checks the data traffic in both directions, and maintains an internal state which depends on use patterns and which influences the filtering decisions. This may cause problems for a new user, since the internal state is inherited from the old one. The same problem is evident in case there is any other kind of intelligence along the route, e.g. different qualities of service may be supported.

The above problems associated with the early reuse of a user identification, e.g. tunnel identifier or PDP address, can be alleviated by introducing a sufficient delay between deactivating a user identification and reactivating it for another user. This can be achieved by putting the user identifications on a pool that circulates, so that a deactivated identification will not be activated before the other identifications in the pool have been used. However, in the case of IPv6, a large number of addresses would have to be stored, possibly millions for a transparent Internet access point (AP). Thus, a large memory would be required. Moreover, the delay time may be inadequate for highly dynamic environments.

Alternatively, a delay counter may be allocated to each user identification, which prevents an early activation. However, this adds complexity to the address manager, because each address counter has to be updated and driven by a real time clock. One counter is required for each possible identification, such that the counter array requires almost as much memory as the address pool.

SUMMARY OF THE INVENTION

It is therefore an object of the present invention to provide a method and apparatus for generating a connection identification, by means of which a unique allocation of the identification can be assured in an efficient way.

This object is achieved by a method for generating an identification to be used for a connection in a telecommunication network, said method comprising the steps of:

allocating an address to said connection;

adding a reuse information to said allocated address so as to generate said identification;

updating said reuse information; and using said updated reuse information for generating a new identification when said allocated address is reallocated to a new connection.

Furthermore, the above object is achieved by an apparatus for generating an identification to be used for a connection in a telecommunication network, said apparatus comprising:

allocating means for allocating an address to said connection;

generating means for generating a reuse information; adding means for adding said reuse information to said allocated address so as to generate said identification; and control means for controlling said generating means so as to update said reuse information;

wherein said adding means is arranged to use said updated reuse information for generating a new identification, when said allocated address is reallocated to a new connection.

Accordingly, a reuse information is incorporated into the identification such that the same identification is not used before the reuse information resumes an old value. Therefore, it is assured that several sessions are performed between two contexts for which the same identification or address is used. However, contrary to the address pool, only the reuse information has to be stored, such that the memory or state machine requirements are substantially reduced. Thereby, the uniqueness of the identification (e.g. dynamic address) can be guaranteed locally without communicating with other nodes, wherein a cooling period is provided, i.e. the identification remains unique also along the temporal axis.

The reuse information can be a field that changes at every use but has no real information content, or a running index that refers to a real identity (e.g. an index to an array of records). The identification is then generated as an invertible function of the reuse information, in the simplest case a concatenation. The same address will repeat only after the reuse information wraps around. If so, packets addressed to an expired address can be detected and removed with a possible notification to the sending party.

The amount of bits of the reuse information depends on the situation. If sessions are long, even a one-bit reuse information can be enough, because the "dangling threads" will have expired by the end of the next session using the same reuse information. However, if the sessions are short, it may be necessary to use more bits for the reuse information, where the number of bits depends on how many contemporary sessions are needed.

Since the reuse information has to be modified only once per session, the proposed solution is easy to implement and does not need a real time clock. Moreover, the reuse information does not need any management, because it contains no information related to the connection or subscriber.

In addition thereto, the proposed identification mechanism protects the user's privacy, since the identification can be generated based on dynamic addresses which do not refer to the user identity.

Thus, the possibility of any data misrouting or misdirection due to an early reuse of the same identification in a network node can be substantially decreased, while virtually no performance loss is caused.

The identification may be an IPv6 address, and the allocated address may be an index to a context array. The reuse information may then be stored in the context array. In particular, the reuse information may be a predetermined bit or field set in said IPv6 address. The value of the predetermined bit may be changed so as to update the reuse information. Alternatively, in case a field is used, the field may be set by a counter.

Preferably, the allocated address may be a dynamic address selected from a predetermined address pool.

Furthermore, the reuse information may be updated between an activation and a deactivation of a context of said connection. Thereby, it is assured that the reuse information is updated before the allocated address is used or reallocated for a new connection. The updating may be performed by an incrementation. Thus, a simple counter can be provided for generating and updating the reuse information.

The identification may be generated using a function that takes the allocated address and the reuse information as arguments, said function being a one-to-one mapping function. Due to the one-to-one mapping, the uniqueness of the identification can be assured.

As an alternative, the identification may be a tunnel endpoint identifier for a context array, and said allocated address may be a context identifier pointing to a context position in said context array. In this case the reuse information may be a predetermined number of bits of the tunnel endpoint identifier which are not used for said context identifier. The reuse information may be a value of a reuse counter and may be updated by incrementing the counter when the context identifier is returned to a free identifier list. Thus, the reuse information is updated at any context deactivation, such that an early reuse of the same identification is prevented. The reuse counter may be provided for each context position of said context array. Furthermore, the reuse counter may be reset when a tunnelling process is initialized. Thereby, a default value of the reuse information can be assured at any initialisation.

The adding means may be arranged to add the reuse information by setting a predetermined bit or field of the IPv6 address.

Furthermore, the control means may be arranged to perform control so as to update the reuse information between an activation and a deactivation of a context of the connection. The generating means may be arranged to perform the updating by an incrementation operation.

Alternatively, the adding means may be arranged to generate the identification by using a function that takes the allocated address and the reuse information as its arguments, the function being a one-to-one mapping function.

The apparatus may comprise a means for generating a rejection message indication that the connection endpoint of the connection is unreachable, if an identification with a wrong reuse information has been received by said apparatus.

As a further alternative, the adding means may be arranged to add the reuse information by setting a predetermined number of bits of the tunnel endpoint identifier, which are not used for the context identifier. The generating means may comprise a counter, wherein the control means is arranged to increment the counter when the context identifier is returned to a free identifier list. In particular, the counter may be provided for each context position of the context array. The control means may be arranged to reset the counter when a tunnelling process is initialized.

Furthermore, the apparatus may comprise comparing means for comparing the value of a reuse information filtered by a filtering means from an identification of a data packet received by the apparatus with the counter value of the counter, and discarding means for discarding the received data packet in response to an output signal of the comparing means. Thereby, a routing of a data packet with a wrong tunnel endpoint identifier can be prevented.

The apparatus may be a GPRS support node such as an SGSN or a GGSN.

BRIEF DESCRIPTION OF THE DRAWINGS

In the following, the present invention will be described in greater detail on the basis of preferred embodiments with reference to the accompanying drawings, in which.

DESCRIPTION OF THE PREFERRED EMBODIMENTS

Figure 1:
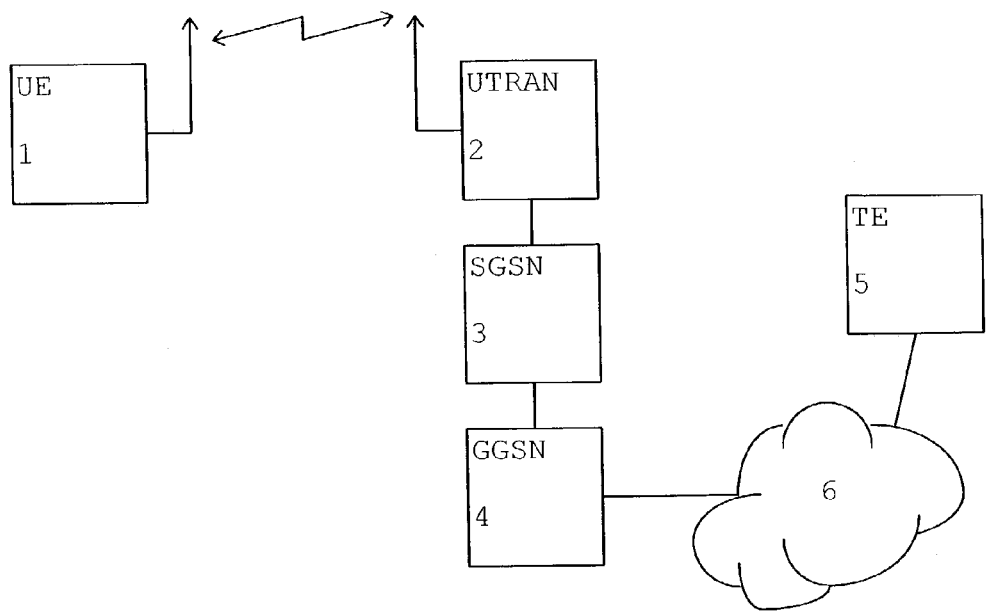
FIG. 1 shows a basic block diagram of a UMTS network connected to an IP network, in which the preferred embodiments of the present invention can be implemented.

In the following, the first and second preferred embodiments of the method and system according to the present invention will be described on a basis of a UMTS system connected to an IP network 6 as shown in FIG. 1.

According to FIG. 1, the UMTS network comprises a UTRAN (UMTS Terrestrial Radio Access Network) 2 connected to a GPRS-based core network, wherein a connection to the IP network 6 is established via an SGSN 3 and a GGSN 4. Furthermore, a user equipment (UE) 1, e.g. a mobile terminal or station, is radio-connected to the UTRAN 2. The UTRAN 2 is a wireless access network which provides access to the GPRS-based core network of the UMTS network. The IP network 6 may be any IP-based network which can be connected to the UMTS network. Furthermore a terminal equipment (TE) 6 is shown, which may be any voice or data terminal connected to the IP network 6.

Thus, according to FIG. 1, a data or voice call or any kind of transaction, such as a service message or download programme or the like, can be transferred between the UE 1 and the TE 5 via the UMTS network and the IP network 6.

The main objective of the GPRS core network is to offer a connection to standard data networks (using protocols such as TCP/IP, X25, and CLNP (Connectionless Network Protocol)). As already mentioned, the main functions of the GGSN 4 involve interaction with the external IP network 6. The GGSN 4 updates the location directory using routing information supplied by the SGSN 3 about a path of a concerned mobile terminal and routes the external data network protocol packet encapsulated over the GPRS backbone to the SGSN 3 currently serving the concerned mobile terminal (i.e. the UE 1). It also decapsulates and forwards external data network packets to the IP network 6 and handles the charging of data traffic.

When the UE 1 is switched on, the first procedure performed between the UE 1 and the GPRS core network is radio-synchronisation. When the UE 1 wants to start using the GPRS service of the UMTS network, it initiates a context activation procedure to establish a context of the logical link between the UE 1 and the SGSN 3 using a dedicated control channel as a carrier. In the context activation procedure, the UE 1 sends a context activation request message to the SGSN 3. The UE 1 may use an Access Point Name to select a reference point to the IP network 6. The Access Point Name is a logical name referring to the external packet data network that the subscriber wishes to be connected to. The SGSN 3 validates the context activation request message and determines the GGSN 4 according to the received Access Point Name. If a GGSN address can be derived by the SGSN 3, the SGSN 3 creates a tunnel identifier (TID) for the requested PDP context. If the UE 1 has requested a dynamic address, the SGSN 3 lets the GGSN 4 allocate the dynamic address. Then, the SGSN 3 sends a context creation request message to the GGSN 4. The GGSN 4 uses the Access Point Name to find the requested IP network 6. Furthermore, the GGSN 4 creates a new entry in its PDP context table. The new entry allows the GGSN 4 to route data packets between the SGSN 3 and the IP network 6. Then, the GGSN 4 returns a context creation response message to the SGSN 3, wherein the response message includes the PDP address allocated by the GGSN 4 in case a dynamic address has been requested.

Having received the PDP address from the GGSN 4, the SGSN 3 inserts it into its PDP context and returns a context activation accept message including the PDP address to the UE 1. The SGSN 3 is now able to route data packets between the GGSN 4 and the UE 1.

In case a connection is no longer required, the UE 1 may initiate a PDP context deactivation procedure. To achieve this, the UE 1 sends a context deactivation request message to the SGSN 3. In response thereto, the SGSN 3 sends a context deletion request message comprising the TID to the GGSN 4 which then removes the PDP context and returns a context deletion response message including the TID to the SGSN 3. If the UE 1 was using a dynamic PDP address, the GGSN 4 releases this PDP address and makes it available for subsequent activations by other UEs. The SGSN 3 returns a context deactivation accept message to the UE 1.

The first and second embodiments relate to implementations of the invention at different protocol layers, wherein the protocol layers are numbered as seen by an end user.

In the following, the first preferred embodiment will be described on the basis of a layer 3 (L3) signaling. In L3, a protocol must be defined. This may be the JPv6 where an IPv6 address is generated in the GGSN 4. However, the mechanism can be provided in any other L3 protocol which uses dynamic addresses.

Figure 2:
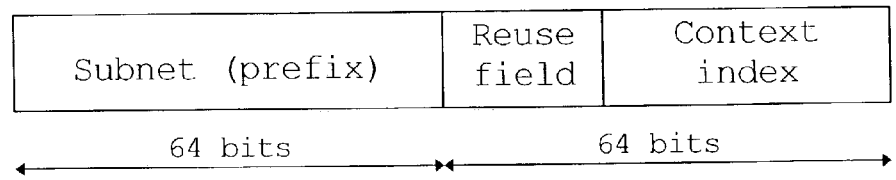
FIG. 2 shows a diagram indicating contents and format of an IPv6 address according to a first preferred embodiment of the present invention.

FIG. 2 shows a diagram indicating the contents and format of the IPv6 address. According to FIG. 2, the JPv6 address includes a prefix set by the Access Point (AP) of the IP network 6 and being constant for each AP. The subnet prefix has a length of 64 bits. Furthermore, the IPv6 address includes a suffix generated from two parts, i.e. a context index to a table of active PDP contexts arranged in the GGSN 4, and a reuse bit or field used as a reuse information which is updated (i.e. which changes) between sessions. The suffix also has a length of 64 bits. It is to be noted that the reuse field does not have to be arranged in the middle of the IPv6 address. The reuse bit or bits can be distributed anywhere within the suffix part. The reuse bit or field does not contain any information. From the user's point of view it is a random bit or field. The lengths of the prefix and suffix may vary in other telecommunication systems which differ from the described GPRS network.

The reuse bit or field can be updated at any time between a context deactivation and its reactivation. In the following example of the preferred embodiment, the reuse field or bit is updated when a new context is activated. The update function is not a critical feature, as long as it changes the value of the reuse field or bit. It can be a simple incrementation operation.

The context or array index is unique within the AP (or even within the GGSN 4). The IPv6 address can be formed as a combination of the subnet prefix (constant for each AP), the context index and the reuse field. The prefix and the context index would be enough to identify a respective context uniquely at any given time. However, they cannot separate different PDP contexts used at different points in time. Therefore, according to the preferred embodiment of the present invention, the reuse field or bit has been introduced. The reuse value is updated or modified before it is added to the IPv6 address so as to assure that the generated IPv6 address is new.

Figure 3:
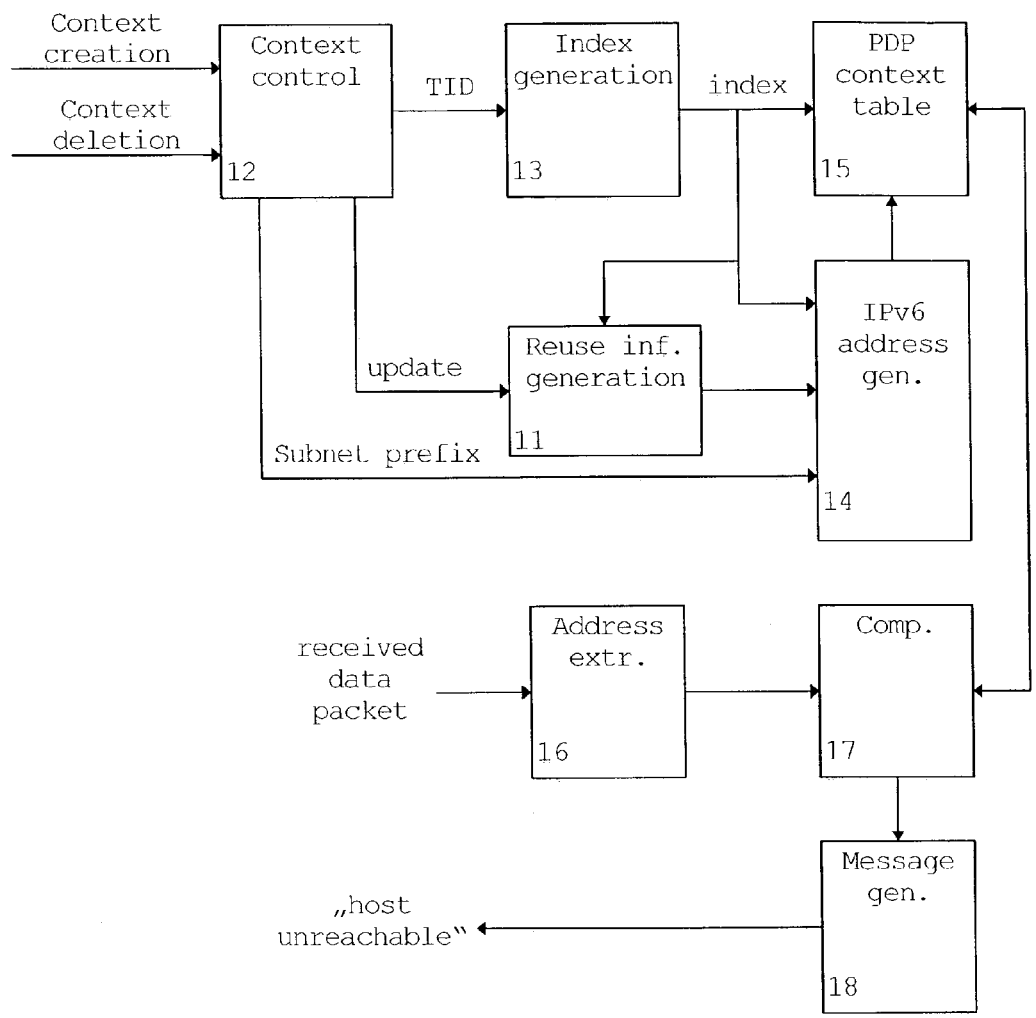
FIG. 3 shows a block diagram of a gateway GPRS support node according to the first preferred embodiment of the present invention.

FIG. 3 shows a basic block diagram of the GGSN 4 according to the first preferred embodiment. It is to be noted that only those blocks essential to the present invention are shown in FIG. 3.

According to FIG. 3, a context control unit 12 which may be any processing means (e.g. a CPU or the like) controlled by a corresponding control program which is stored in a program memory (not shown) is provided for controlling a PDP context table 15. The PDP context table 15 is provided for storing activated PDP contexts of connections or sessions. When a PDP context is activated by the UE 1, the SGSN 3 sends a corresponding context creation request message to the GGSN 4, which is received by the context control unit 12. Upon receipt of the context creation request message, the GGSN 4 allocates a record for the corresponding PDP context. This record will be used for various needs, such as control flags, addresses and other parameters, datagram buffers, etc. The PDP context table 15 comprises a context array storing the records of the activated PDP context. The context creation request message includes the TID which is the official address of the PDP context and which is 64 bits long. However, this length is too large to be used within the GGSN 4. Therefore, a context index to the context array is generated in an index generation unit 13 based on the TID supplied from the context control unit 12. The context index is used as an identifier or identification used for identifying the PDP context of the corresponding connection.

Each time a PDP context is activated, i.e. a context creation request message is received, the context control unit 12 issues an update command to a reuse information generation unit 11 so as to update the reuse bit or field associated to the corresponding PDP context. The context index required for defining the respective reuse bit or field is supplied from the index generation unit 13. The reuse field need not be long. Even one bit could be enough. The change of the reuse field between sessions (e.g. PDP context activations) may be a simple flip or change of the reuse bit in case a single bit is used. Thus, in this case, the required additional memory consumption is only one bit for each possible active context, and the reuse information generation unit 11 may comprise a flip flop or any other means for setting and resetting a bit value. In case a reuse field of more than one bit is used, the reuse generation unit 11 may comprise a counter which rolls over, e.g. a ring counter.

The generated reuse information is supplied together with the context index to an IPv6 address generation unit 14 arranged to generate the IPv6 address shown in FIG. 2. Additionally, the subnet prefix which is derived by the context control unit 12 e.g. from the Access Point Name included in the context creation request message is supplied to the IPv6 address generation unit 14. The IPv6 address generation unit 14 may be a simple register in which the respective bit values are set according to the format of the IPv6 address. Alternatively, the IPv6 address generation unit 14 may be a digital signal processor which implements a function that takes the context index and the reuse field as its arguments. The function must be a one-to-one mapping to guarantee the uniqueness of the suffix. The generated IPv6 address is incorporated into the context creation response message sent from the GGSN 4 to the SGSN 3, and is used for addressing the corresponding connection endpoint at the IP network 6. Furthermore, the IPv6 address generation unit 14 is arranged to store the received reuse field or bit in the respective context record of the PDP context table 15.

Since the IPv6 address contains the context index to the PDP context table 15, the proper context record can be easily obtained for mobile-terminated datagrams. If the context index is located in the lowest or least significant bits of the IPv6 address, as shown in FIG. 2, the value thereof can be extracted with a simple masking operation.

The index generation in the index generation unit 13 may be based on a digital transcoding function which generates a context index of a predetermined index pool based on the supplied TID value. Thus, a dynamic context index or address is allocated to the TID.

When a data packet including an IPv6 address in its header portion is received by the GGSN 4, it is supplied to an address extraction unit 16 which extracts the IPv6 address from the received data packet. The extracted IPv6 address is supplied to a comparison unit 17 which uses the contact index of the extracted IPv6 address so as to read the corresponding reuse value from the PDP context table 15 and which compares the read reuse value with the reuse value contained in the extracted IPv6 address. The comparison result, i.e. whether the received reuse value is identical with the stored reuse value or not, is supplied to a message generating unit 18. The message generation unit 18 generates a rejection message, e.g. "host unreachable", if the comparison result indicates that the received reuse value is not identical to the stored reuse value. In case of IP, this can be achieved by using a standard ICMP (Internet Control Message Protocol) error message (e.g. type 3, code 1) as defined in the specification RFC792. Thereby, the sender is informed about the lost host, because at L3 the sender is globally visible to other L3 parties along the path. This will tear down the dangling threads faster than if the packets were just dropped. In this case, the received IPv6 address is no longer valid, since the context has been deleted. Thus, the generation of the rejection message supplied to the UE 1 via the SGSN 3 assures that any remaining sessions or connections are terminated or released.

In case of a deactivation of a context, the GGSN 4 receives a context deletion request message from the SGSN 3. In this case, the usual context deletion processing is performed and no extra operations are required. Thus, the context control unit 12 controls the PDP context table 15 via the index generation unit 13 so as to delete or deactivate the corresponding record in the context array.

There are many other application examples that need a dynamic IP address, e.g. the Dynamic Host Configuration Protocol (DHCP). Even in DHCP it is not defined how the bit pattern of the address is generated, only how it is delivered to the requesting party. A further example is the L3 gateway. A Network Address Translator (NAT) maps private IPv4 addresses to public ones. The NAT concept is described e.g. in "IP Network Address Translator (NAT) Terminology and Considerations" by P. Srisuresh and M. Holdrege, RFC 2663. The allocated public address should have "cooled" the same way as in the above first embodiment. Therefore, it could contain similar reuse and index fields. In addition thereto, NAT-PT for performing NAT and protocol translation (IPv4↔IPv6) is an L3 gateway. The NAT-PT concept is described in "Network Address Translation—Protocol Translation (NAT-PT)" by G. Tsirtsis and P. Srisuresh, RFC 2766, February 2000. Another L3 gateway where the present invention can be applied is defined in the Realm-Specific IP(RSIP) draft, as defined by M. Borella et al in "Realm Specific IP: Framework", draft-ietf-nat-rsip-framework-04.txt, March 2000.

If the parties need a secure connection, they may run IPsec which defines a Security Parameter Index (SPI) specifying the security association which is to be used. IPsec is described e.g. in "Security architecture for the Internet Protocol" by S. Kent et al, RFC 2401, November 1998. The SPI is a 32 bit number which should be unique within the context of the party that selects it. A similar SPI is used e.g. in mobile IP concept. Thus, the present invention may as well be applied for the generation of the SPI.

In the following, the second preferred embodiment is described with reference to FIGS. 4 and 5. In particular, the second embodiment relates to the generation of a unique address to handle L2 addressing, e.g. a Tunnel Endpoint Identifier (TEID) of the GTP in a GPRS support node (e.g. the SGSN 3 or the GGSN 4). In the second preferred embodiment, the risk of transmitting data packets to wrong users is decreased by adding a redundant reuse information to the four-octet TEID.

Figure 4:
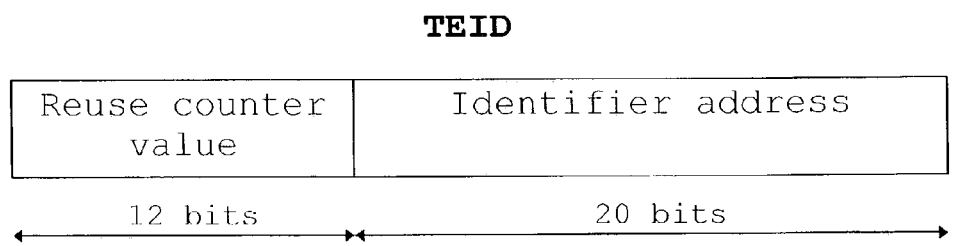
FIG. 4 shows a diagram indicating contents and format of a tunnel end point identifier according to a second preferred embodiment of the present invention.

FIG. 4 shows a diagram indicating the contents and format of the TEID. According to FIG. 4, the TEID contains 32 bits of which the lower 20 bits are used as an identifier address for addressing respective context positions in a PDP context table of the GSN (GPRS support node). The remaining higher 12 bits are not required for the identifier address. Thus, these bits can be used for a reuse information such as a counter value which counts the number of reuses of the identifier address. However, any other number of bits can be selected for the respective contents of the TEID. The length of the identifier address depends on the number of simultaneous PDP contexts which the GSN can support. If the GSN supports a maximum of e.g. one million tunnel endpoints, the identifier address can be represented with 20 bits, as in the case shown in FIG. 4.

Figure 5:
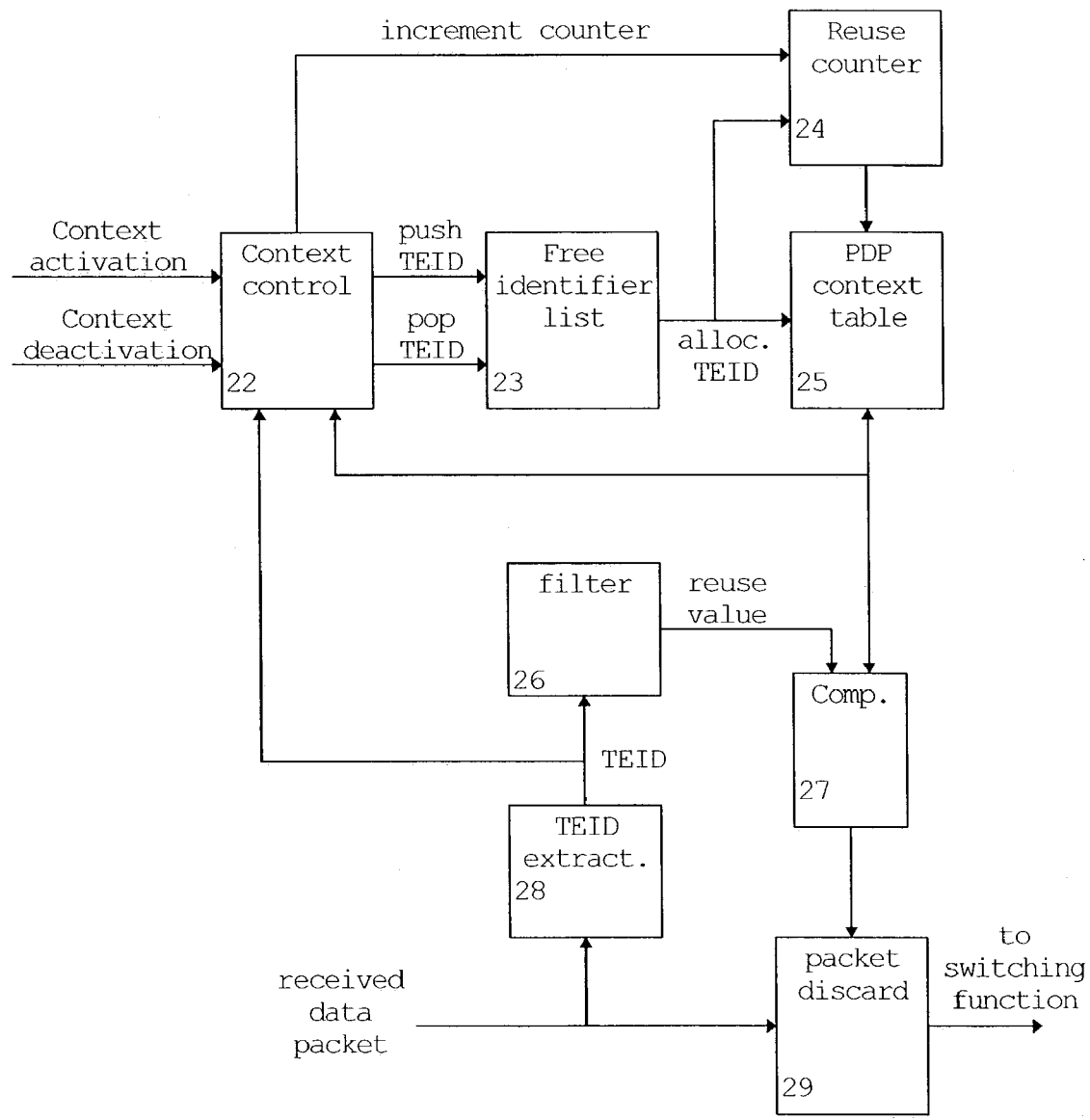
FIG. 5 shows a basic block diagram of a GPRS support node according to the second preferred embodiment of the present invention.

FIG. 5 shows a basic block diagram of a GSN such as the SGSN 3. Also in this case, it is noted that only those blocks of the SGSN 3 which are essential to the present invention are shown. According to FIG. 5, a context control unit 22 is provided, which is arranged to control a PDP context table 25 via a free identifier list 23. The free identifier list 23 and the PDP context table 25 may be arranged in a single memory. In particular, the free identifier list 23 can be regarded as a stack or FIFO (First-In-First-Out) memory, wherein a new identifier address of an activated context is popped from the beginning, and an old identifier address of a deactivated context is pushed to the end of the list.

When the context control unit 22 receives a context activation request message from the UE 1, it controls the free identifier list 23 by a pop TEID command so as to allocate the TEID stored at the beginning of the list to the new context. The allocated TEID is supplied as an address to the PDP context table 25 in order to store the corresponding record of the activated PDP context. In case a context deactivation request message is received from the UE 1, the context control unit 22 issues a push TEID command to the free identifier list 23 so as to deallocate the corresponding TEID and to push the deallocated TEID to the free identifier list 23. The value of the upper 12 bits of the TEID are set based on a counter value of a reuse counter unit 24 connected to the PDP context table 25, wherein the PDP context table 25 is arranged to add the count value of the reuse counter unit 24 to the respective record in the context table 25. The reuse counter unit 24 may comprise a counter for every context position in the PDP context table 25. The respective counter is addressed by the allocated TEID comprising the identifier address of the corresponding activated PDP context in the PDP context table 25. The count value of the respective reuse counter is set into the respective reuse counter value bits of the TEID. Thus, the upper bits of the TEID are made significant.

When a tunnelling process is initialized, all reuse counters of the reuse counter unit 24 are reset to a default value, e.g. to zero. Each time a context deactivation request message is received, the context control unit 22 issues an increment counter command to the reuse counter unit 24 which increments the respective reuse counter based on the allocated TEID supplied from the free identifier list 23 based on a push TEID command issued by the context control unit 22. The allocated TEID is used to delete the corresponding record in the PDP context table 25. Thus, each time a identifier address is returned to the free identifier list 23, the reuse counter for this PDP context is incremented. The counter value is read by the context control unit 22 from the PDP context table 25 and is shifted by 20 bits (or any other value depending on the length of the identifier address) and added to or set in the respective TEID. This modified identification or identifier is then used as the TEID for the respective session or connection.

When a data packet is received by a SGSN 3, the TEID included in the header of the data packet is extracted in a TEID extraction unit 28 and supplied to the context control unit 22 so as to derive the corresponding PDP context record. Furthermore, the received TEID is supplied to a filter unit 26 arranged to filter or extract the reuse value of the received TEID. The operation of the TEID extraction unit 28 and the filter 26 may be based on a simple masking and shifting operation. The received reuse value is supplied to a comparing unit 27 to which the stored reuse counter value of the corresponding PDP context record is supplied under control of the context control unit 22 based on the received TEID. Alternatively, the received TEID may be supplied to the comparison unit 27, and the comparison unit 27 may address the PDP context table 25 so as to read the stored reuse value.

Then, the comparison unit 27 compares the received reuse value with the stored reuse value and outputs the comparison result to a packet discard unit 29. The received data packet is supplied through the packet discard unit 29 to a switching function of the SGSN 3. If the comparison result of the comparison unit 27 indicates that the reuse value of the received data packet does not match the stored reuse value of the respective context record, the received data packet is discarded in the packet discard unit 29. The difference between the received reuse value and the stored reuse value indicates that the received data packet relates to a destroyed or released connection or session and can be discarded to thereby prevent any misrouting of data packets.

The time period until the reuse counters roll over depends on the length of the reuse counter value, e.g. 12 bits in the present case. Thus, an identical TEID is not generated before the respective reuse counter has rolled over. In the present case, the same identifier address can be used for $2^{12}$ (4096) times until the same reuse counter value is added. Thereby, the risk of misrouting a data packet is largely reduced.

It is to be noted that the block diagram shown in FIG. 5 may as well relate to the GGSN 4. Then, the control of the reuse counter 24 may be controlled on the basis of a context creation or context deletion request message received from the SGSN 3.

As compared to the first embodiment, the TEID corresponds to the IPv6 suffix, i.e. the reuse counter corresponds to the reuse field or bit and the identifier address corresponds to the context index. Moreover, the TEID of L2 can be used as a part of the L3 address. The mapping can be a simple concatenation with padding, or some other one-to-one function. In the fastest implementation, the identifier address may be present in the lowest 20 bits of the IPv6 address. This mapping is not a requirement but provides a shortcut through the protocol layers.

The routing tables of the GGSN 4 may comprise a stale information about mapping an L3 address to a TEID. Then, packets arriving to an old PDP context can be detected and discarded, because the TEID is no longer in use. An advantage of doing the address uniqueness check in L2 is protocol independence. No matter which protocol an old PDP context was using, the L2 mechanism will detect the packets belonging to the old context. On the other hand, since the mechanism is independent of the L3 protocol, it does not provide any feature to inform the sending party that the recipient does not exist any longer.

It is again pointed out that the present invention is not restricted to the IPv6 address or the TEID used in the described GPRS core network of the UMTS network. The present invention can be applied to any identification, e.g. identifier or address in any kind of network, to thereby increase the time period until the same identification is reused in the network. Even in higher protocol layers such as L4 the present invention can be applied. E.g., L4/L3 gateways are arranged to bind together L4 addresses (i.e. port numbers) and L3 addresses. Two examples are the NAPT (Network Address and Port Translator) and the SOCKS concept. The NAPT maps IPv4 session addresses to others, including the TCP (Transmission Control Protocol) and UDP (User Datagram Protocol) port numbers.

NAPT is needed when an intranet uses private address space, as described e.g. in "Address Allocation for Private Internet" by Y. Rekhter et al, RFC 1597, March 1994. However, occasionally the hosts need to access the public Internet, as well. There is a similar functionality called NAPT-PT which translates JPv4 and IPv6 addresses and also the packet header formats. In the NAPT cases, the public address and port should not be allocated to another session for a while. In a typical NAPT case, there is a pool of public IPv4 addresses (e.g. the lowest 4 bits of a subnet) and 4096 mappable port values starting at about 61000. Thus, 4+12=16 bits can be allocated to each TCP session through the NAPT. No allocated combined address should be available for a while after the binding has been discarded. This can be prevented by the reuse identification concept according to the present invention.

Another L4/L3 gateway is SOCKS which is described e.g. in "SOCKS protocol version 5" by M. Leech et al, RFC 1928, March 1996. A "socksified" application needing a socket to another application requests for a connection from a SOCKS server. The request contains the identity of the other host, e.g. IPv4 or IPv6 address, or DNS (Domain Name Server) name, and the port number. The SOCKS server forms separate sockets with the requesting and the requested party, and mediates the traffic between them. In both sockets, the port numbers of the SOCKS server should have a cooling period, i.e. a reuse identification concept according to the present invention.

Thus, the above description of the preferred embodiments and the accompanying drawings are only intended to illustrate the present invention. The preferred embodiments may vary within the scope of the attached claims.

In summary, the present invention relates to a method and apparatus for generating an identification to be used for a connection in a network. The identification is generated by adding a reuse information to an allocated identifier to thereby increase the time period until the same identification is generated again. The reuse information is updated and used for generating the new identification when the allocated identifier is reallocated to a new connection. Since the time period until the same identification is reused is increased, the risk of misrouting any data packets relating to a destroyed connection can be significantly reduced.

The invention claimed is:

1. A method for generating an identification to be used for a connection in a network, said method comprising the steps of:
   a) allocating an identifier to said connection;
   b) adding a reuse information to said allocated identifier so as to generate said identification;
   c) updating said reuse information; and
   d) using said updated reuse information for generating a new identification when said allocated identifier is reallocated to a new connection, wherein said identification is an IPv6 address, and said allocated identifier is an index to a context array,
   wherein said reuse information is stored in said context array, and
   wherein said reuse information is updated between an activation and a deactivation of a context of said connection.

2. A method according to claim 1, wherein said reuse information is a predetermined bit or field set in said IPv6 address.

3. A method according to claim 2, wherein the value of said predetermined bit is changed so as to update said reuse information.

4. A method according to claim 2, wherein said field is set by a counter.

5. A method according to claim 1, wherein said allocated identifier is a dynamic address selected from a predetermined address pool.

6. A method according to claim 1, wherein said updating is an incrementation.

7. A method according to claim 1, wherein said identification is generated using a function that takes said allocated identifier and said reuse information as its arguments, said function being a one-to-one mapping function.

8. A method according to claim 1, wherein a message indicating that the connection endpoint of said connection is unreachable is generated if an identification with a wrong reuse information has been received in a network node of said network.

9. A method according to claim 1, wherein said method is used for generating a DNCP address, a public address of a NAT function, an RSIP address, an address and a port number of a SOCKS server or a NAPT function.

10. A method for generating an identification to be used for a connection in a network, said method comprising the steps of:
   a) allocating an identifier to said connection;
   b) adding a reuse information to said allocated identifier so as to generate said identification;
   c) updating said reuse information; and
   d) using said updated reuse information for generating a new identification when said allocated identifier is reallocated to a new connection,
   wherein said identification is a tunnel endpoint identifier for a context array, and said allocated identifier is a context identifier pointing to a context position in said context array.

11. A method according to claim 10, wherein said reuse information is a predetermined number of bits of said tunnel endpoint identifier, which are not used for said context identifier.

12. A method according to claim 10, wherein said reuse information is defined by a value of a reuse counter and is updated by incrementing said counter when said context identifier is returned to a free identifier list.

13. A method according to claim 12, wherein said reuse counter is provided for each context position of said context array.

14. A method according to claim 12, wherein said reuse counter is rest when a tunneling process is initialized.

15. A method according to claim 12, wherein the value of a reuse information of an identification of a data packet received at a network node of said network is compared to the counter value of said reuse counter, and wherein said received data packet is discarded when the compared values differ from each other.

16. An apparatus for generating an identification to be used for a connection in a network, said apparatus comprising:
   a) allocating means for allocating an identifier to said connection;
   b) generating means for generating a reuse information;
   c) adding means for adding said reuse information to said allocated identifier so as to generate said identification; and
   d) control means for controlling said generating means so as to update said reuse information;
   e) wherein said adding means is arranged to use said updated reuse information for generating a new identification, when said allocated identifier is reallocated to a new connection,
   wherein said identification is an IPv6 address and said allocated identifier is an index to a context array,
   wherein said reuse information is stored in said context array, and
   wherein said control means is arranged to perform control so as to update said reuse information between an activation and a deactivation of a context of said information.

17. An apparatus according to claim 16, wherein said adding means is arranged to add said reuse information by setting a predetermined bit or field of said IPv6 address.

18. An apparatus according to claim 17, wherein said generating means is arranged to change the value of said predetermined bit so as to update said reuse information.

19. An apparatus according to claim 17, wherein said generating means comprises a counter for generating said reuse information.

20. An apparatus according to claim 16, wherein said generating means is arranged to perform said updating by an incrementation operation.

21. An apparatus according to claim 16, wherein said adding means is arranged to generate said identification by using a function that takes said allocated identifier and said reuse information as its arguments, said function being a one-to-one mapping function.

22. An apparatus according to claim 16, wherein said apparatus comprises a means for generating a rejection message indicating that the connection endpoint of said connection is unreachable if an identification with a wrong reuse information has been received by said apparatus.

23. An apparatus according to claim 16, wherein said apparatus is a gateway GPRS support node.

24. An apparatus according to claim 16, wherein said apparatus is a GPRS support node.

25. An apparatus according to claim 16, wherein said apparatus comprises a DHCP function, an NAT function, an NAPT function or SOCKS function.

26. An apparatus for generating an identification to be used for a connection in a network, said apparatus comprising:
   a) allocating means for allocating an identifier to said connection;
   b) generating means for generating a reuse information;
   c) adding means for adding said reuse information to said allocated identifier so as to generate said identification; and
   d) control means for controlling said generating means so as to update said reuse information;
   e) wherein said adding means is arranged to use said updated reuse information for generating a new identification, when said allocated identifier is reallocated to a new connection, and
   wherein said identification is a tunnel endpoint identifier for a context array and said allocated identifier is a context identifier pointing to a context position in said context array.

27. An apparatus according to claim 26, wherein said adding means is arranged to add said reuse information by setting a predetermined number of bits of said tunnel endpoint identifier, which are not used for said context identifier.

28. An apparatus according to claim 26, wherein said generating means comprises a counter, and wherein said control means is arranged to increment said counter when said context identifier is returned to a free identifier list.

29. An apparatus according to claim 28, wherein said counter is provided for each context position of said context array.

30. An apparatus according to claim 28, wherein said control means is arranged to reset said counter when a tunneling process is initialized.

31. An apparatus according to claim 26, further comprising comparing means for comprising the value of a reuse information filtered by a filtering means from an identification of a data packet received by said apparatus with the counter value of said counter and discarding means for discarding said received data packet in response to an output signal of said comparing means.

* * * * *